United States Patent
Xu et al.

(10) Patent No.: US 10,298,129 B1
(45) Date of Patent: May 21, 2019

(54) POWER SUPPLYING CIRCUIT FOR DRIVE OF SWITCHING POWER SUPPLY AND SWITCHING POWER SUPPLY

(71) Applicant: JOULWATT TECHNOLOGY (HANGZHOU) CO., LTD, Hangzhou, Zhejiang (CN)

(72) Inventors: Aimin Xu, Zhejiang (CN); Pitleong Wong, Zhejiang (CN); Xunwei Zhou, Zhejiang (CN)

(73) Assignee: JOULWATT TECHNOLOGY (HANGZHOU) CO., LTD, Hangzhou (CN)

( * ) Notice: Subject to any disclaimer, the term of this patent is extended or adjusted under 35 U.S.C. 154(b) by 0 days.

(21) Appl. No.: 16/000,226

(22) Filed: Jun. 5, 2018

(30) Foreign Application Priority Data

Dec. 15, 2017 (CN) .......................... 2017 1 1351693

(51) Int. Cl.
*H02M 3/158* (2006.01)
*H02M 1/08* (2006.01)
*H02M 3/157* (2006.01)

(52) U.S. Cl.
CPC .............. *H02M 3/158* (2013.01); *H02M 1/08* (2013.01); *H02M 3/157* (2013.01)

(58) Field of Classification Search
CPC ........ H02M 1/08; H02M 3/155; H02M 3/157; H02M 3/158; H02M 2003/155; H02M 2003/158
See application file for complete search history.

(56) References Cited

U.S. PATENT DOCUMENTS

| 6,166,925 A | * | 12/2000 | Richter | ............... H02M 3/1563 323/266 |
| 2018/0062641 A1 | * | 3/2018 | Wong | ............... H03K 17/04163 |

FOREIGN PATENT DOCUMENTS

| EP | 2069599 | * | 6/2009 |
| JP | 54086743 | * | 7/1979 |

* cited by examiner

*Primary Examiner* — Matthew V Nguyen
(74) *Attorney, Agent, or Firm* — Kunzler Bean & Adamson

(57) ABSTRACT

A switching power supply using a power switch, and a drive circuit therefor are disclosed. This circuit includes a power supplying capacitor with distal end connected with control terminal of the power switch and proximal end to receive a voltage regulation signal generated by a first control signal and a pulse signal. The power switch may be turned on or off, depending on whether the first control signal is placed in a first state during which the voltage regulation signal is in pulse state with the voltage at said distal end made effective, or in a second state during which the voltage regulation signal is in low-level state with the voltage at said distal end made ineffective. A continuous drive and power supplying for the switching power supply is realized, and the capacitance of said capacitor is small, thereby facilitating circuit integration.

20 Claims, 3 Drawing Sheets

POWER SUPPLYING CIRCUIT FOR DRIVE OF SWITCHING POWER SUPPLY AND SWITCHING POWER SUPPLY

CROSS-REFERENCE TO RELATED APPLICATION

This application claims the benefit of Chinese Patent Application No. 201711351693.9, filed on Dec. 15, 2017, the entire contents of which are incorporated herein by reference.

FIELD

The present invention relates to the technical field of integrated circuits, and, more particularly, relates to a power supplying circuit for drive of a switching power supply, and a switching power supply.

BACKGROUND

Power supply circuits supply power to a drive circuit.

BRIEF SUMMARY

An objective of the present invention is to provide a continuously power suppliable and easy-to-integrate power supplying circuit for drive of a switching power supply, and the switching power supply, so as to solve technical problems associated with a conventional approach to be described in a subsequent section.

To achieve the above mentioned objective, the present invention provides a power supplying circuit for drive of the switching power supply. This power supplying circuit is electrically connected with a control terminal of a power switch of the switching power supply provided and includes a power supplying capacitor. A first (distal) end of the power supplying capacitor is electrically connected with the control terminal of the power switch, and a second (proximal) end of the power supplying capacitor is to receive a voltage regulation signal, which is generated by a first control signal and a pulse signal.

When the first control signal is in a first state, the voltage regulation signal is characterized as being in a pulse state, and for the duration thereof an electric potential at the distal end of the power supplying capacitor is set to an effective state and is used as a power supplying voltage to drive the power switch to conduction.

When the first control signal is in a second state, the voltage regulation signal is characterized as being in a low level state, and for the duration thereof an electric potential at the distal end of the power supplying capacitor is set to an ineffective state to turn off the power switch.

In one embodiment, the power supplying circuit may further include a first switch and a second switch. A control terminal of the first switch receives the first control signal, and a control terminal of the second switch also receives the first control signal, and the receipt of the first control signal by the two switches controls the switching states of the first switch and those of the second switch. The first control signal is transmitted by a logical circuit to the proximal end of the power supplying capacitor. The first terminal of the second switch is electrically connected with the control terminal of the power switch of the switching power supply. A second terminal of the first switch receives an input voltage, and a second terminal of the second switch is grounded. The distal end of the power supplying capacitor is electrically connected with the first terminal of the first switch through a first unidirectional conduction element (with an electric current flowable to the former). The distal end of the power supplying capacitor is electrically connected with the first terminal of the second switch through a second unidirectional conduction element (with an electric current flowable to the latter).

In one embodiment, a logic circuit receives the first control signal and the pulse signal respectively, and outputs a voltage regulation signal. The proximal end of the power supplying capacitor receives the voltage regulation signal.

In one embodiment, when the first control signal is in the first state, the first switch is turned on, and the second switch is turned off. When the first control signal is in a second state, the first switch is turned off, and the second switch is turned on.

In one embodiment, the logic circuit includes a NOR gate, wherein the two input terminals of the NOR gate receive the first control signal and a pulse signal respectively, and the NOR gate outputs the voltage regulation signal. The proximal end of the power supplying capacitor receives the voltage regulation signal through a buffer.

In one embodiment, the first control signal is obtained from an original control signal through an inverter.

In one embodiment, the first switch is a P-channel MOSFET, and the second switch is an N-channel MOSFET.

In one embodiment, the power supplying circuit may further include a third switch, and a first resistor connected between the control terminal and the second terminal of the first switch. A first terminal of the third switch is electrically connected with the control terminal of the first switch, a second terminal of the third switch is grounded, and a control terminal of the third switch receives an original control signal. The control terminal of the first switch will not receive the first control signal.

In one embodiment, a second terminal of the third switch is connected to ground through a first current source.

In one embodiment, the first unidirectional conducting element is a diode or a MOSFET, and the second unidirectional conduction element is also a diode or a MOSFET.

Furthermore, the present invention further provides a switching power supply comprising any one of the power supplying circuits in an embodiment described above for drive of the switching power supply, and the power supplying circuit is connected to the control terminal of the power switch of the switching power supply.

In view of the turn-on state of the power switch of the switching power supply, the present invention achieves supplying of power to drive the switching power supply by setting the voltage to be effective at the distal end of the power supplying capacitor and having a high-frequency pulse received by the proximal end of the power supplying capacitor. In the turn-off state of the power switch of the switching power supply, the voltage is set to be ineffective at the distal end of the power supplying capacitor. The invention can realize a continuous power-supplying drive of the power switch of the switching power supply, and minimizes the capacitance of the power supplying capacitor, thereby facilitating circuit integration.

BRIEF DESCRIPTION OF THE DRAWINGS

The advantages and features of the present embodiments will become more fully understood from the detailed description given herein below in connection with the appended drawings, and wherein.

DETAILED DESCRIPTION OF THE INVENTION

Reference will now be made in detail to particular embodiments of the disclosure, examples of which are illustrated in the accompanying drawings. It will be understood that the disclosure is not limited to these examples. On the contrary, the disclosure is intended to cover alternatives, modifications and equivalents that may be included within the spirit and scope of the disclosure as defined by the appended claims.

Furthermore, in the following detailed description of the present disclosure, numerous specific details are set forth in order to provide a thorough understanding of the present disclosure. However, it will be readily apparent to one skilled in the art that the present disclosure may be practiced without these specific details.

Reference will now be made in detail to particular embodiments of the disclosure, examples of which are illustrated in the accompanying drawings. The accompanying drawings are illustrative and not intended to be limiting, but are examples of embodiments of the invention, which are simplified for explanatory purposes and are not drawn to scale. In addition, some well-known portions may not be shown in the figures.

The term "circuit" means at least either a single component or a multiplicity of components, either active and/or passive, that are coupled together to provide a desired function or functions. The term "signal" means at least one current, voltage, charge, temperature, data, or other signal. A signal may be used to communicate using active high, active low, time multiplexed, synchronous, asynchronous, differential, single-ended, or any other digital or analog signaling or modulation techniques. References in the singular are made merely for clarity of reading and include plural references unless plural references are specifically excluded.

Figure 1:
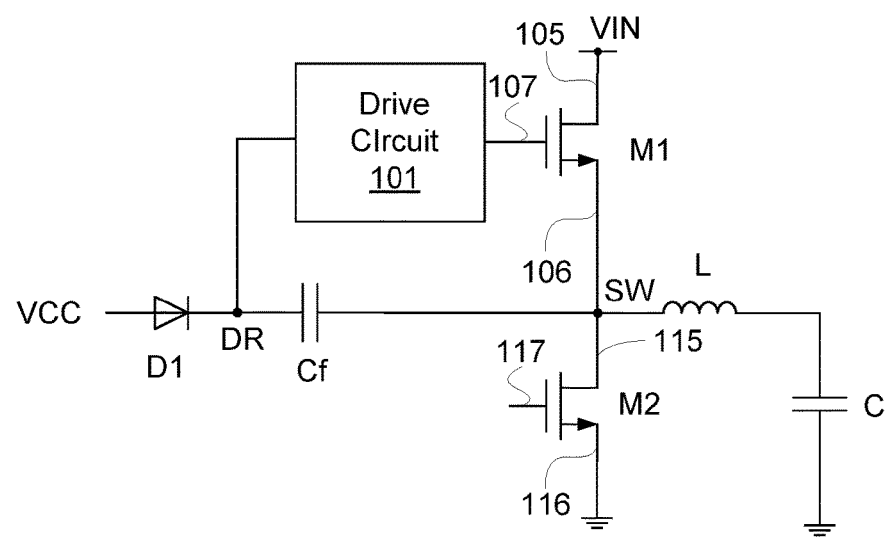
FIG. 1 is a schematic block diagram illustrating one embodiment of a power supplying circuit for drive of a conventional switching power supply.

Some conventional switching power supply circuits such as BUCK converter, BOOST converter, BUCK-BOOST converter and other types need to be powered by power supplying circuits to drive power switches therein for turn-on or turn-off of the power switches. FIG. 1 is a schematic block diagram illustrating one embodiment of a power supplying circuit for drive of a conventional switching power supply 100. As shown, with a Buck converter used as an example, a power supplying circuit to drive a main power switch M1 of the switching power supply 100 includes a diode D1, a drive circuit 101 and a capacitor Cf. An input terminal of the drive circuit 101 is electrically connected with the capacitor Cf at a node DR. An output terminal of the drive circuit 101 is electrically connected with a control terminal 107 of the main power switch M1. The capacitor Cf is electrically connected with both a second terminal 106 of the main power switch M1 and a first terminal of an auxiliary power switch M2 of the switching power supply 100 at a common node SW. Herein with a MOSFET power switch, its drain is the first terminal and its source is the second terminal. When the main power switch M1 is turned off and the auxiliary power switch M2 is turned on, a power supply VCC charges the capacitor Cf. When the auxiliary power switch M2 is turned off, the capacitor Cf discharges through the drive circuit 101 to drive the main power switch M1 to conduction.

To maintain the conduction state of the main power switch M1, the power supplying circuit needs to have the capacitor Cf continuously supply power to the drive circuit 101 for the main power switch M1. However, in the process of discharging, the capacitor Cf s ability to supply power is diminishing, making it difficult to maintain the conduction state of the main power switch M1, and so the capacitor's ability to continuously supplying power is limited. In addition, since the power supplying circuit is integrated into a chip with the capacitor Cf of large capacitance being mounted outside of the chip, chip pin count and the product manufacturing cost may increase.

Figure 2:
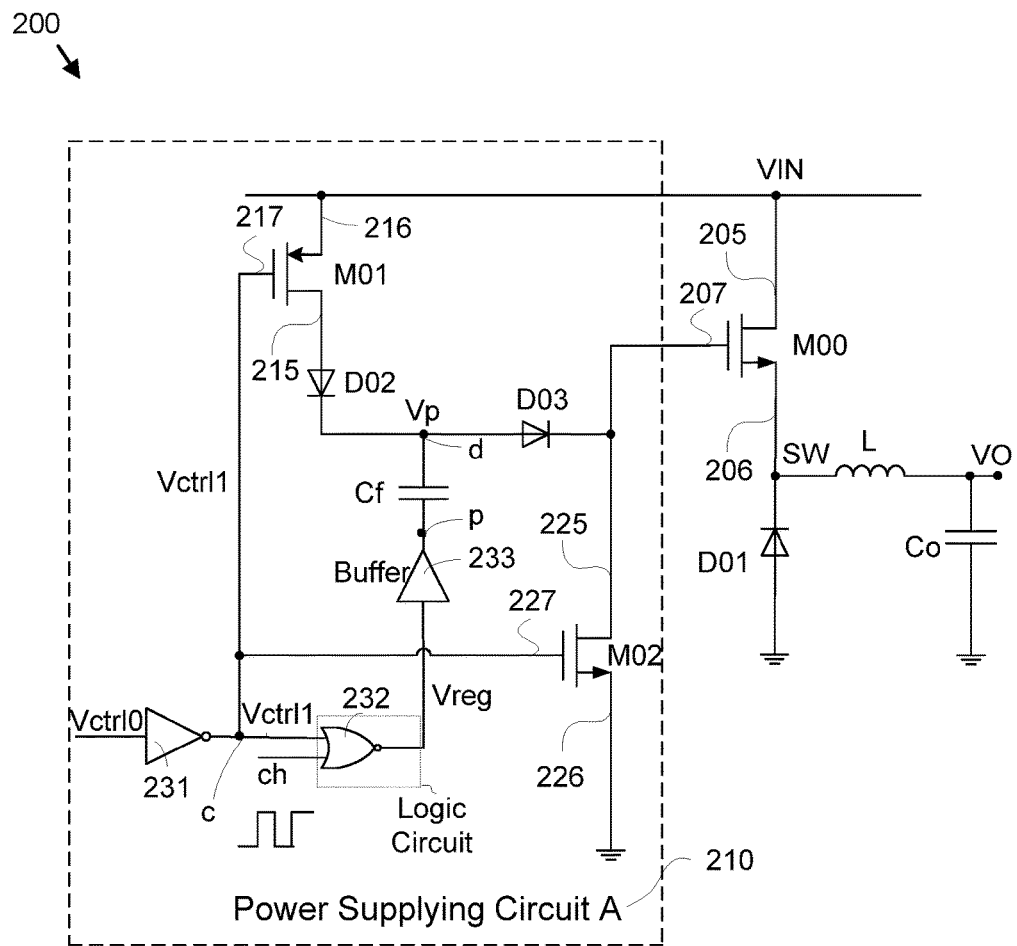
FIG. 2 is a schematic block diagram illustrating one embodiment of a power supplying circuit for drive of a switching power supply of the present invention.

FIG. 2 is a schematic block diagram illustrating one embodiment of a power supplying circuit for drive of a switching power supply 200 of the present invention. As shown, an exemplary Buck converter is used in the switching power supply 200. The switching power supply 200 includes a power switch M00, a freewheeling diode D01, an inductor L, an output capacitor Co and a power supplying circuit A 210.

As shown, a node SW is where the power switch M00, the freewheeling diode D01 and a first end of the inductor L are connected together. A second end of the inductor L is electrically connected with a first end of the output capacitor Co, and a second end of the output capacitor Co is grounded. Across the output capacitor Co a load (not shown) is to be connected. The voltage across the output capacitor Co is usually referred to as output voltage VO. The freewheeling diode D01 as illustrated may be replaced with a MOSFET or another device. Although the shown switching power supply 200 is a Buck topology, it can be substituted by a Boost, Buck-Boost or another topology. The power supplying circuit A 210, used for drive of the switching power supply 200, is electrically connected with a control terminal 207 of the power switch M00.

The power supplying circuit A includes a first switch M01, a second switch M02, a power supplying capacitor Cf, a first unidirectional conduction element D02, a second unidirectional conduction element D03, a buffer 233, a logic circuit including a NOR gate 232, and an inverter (also called NOT gate) 231. A first control signal Vctrl1 at a node c is received by both a control terminal 217 of the first switch M01 and a control terminal 227 of the second switch M02 and the NOR gate 232. Herein the first control signal Vctrl1 given to the first switch M01 as a control signal thereof is just an exemplary implementation. The first control signal Vctrl1 (occurring at node c) used as both a control signal of the first switch M01 and a control signal of the second switch M02 controls switching state of each of the two switches. The first control signal Vctrl1 is also passed from the NOR gate 232 to a proximal end p of the power supplying capacitor Cf through the buffer 233.

A distal end d of the power supplying capacitor Cf is electrically connected with a first terminal 215 of the first switch M01 through the first unidirectional conduction element D02 (through which an electric current can flow to the former) and with a first terminal 225 of the second switch M02 through the second unidirectional conduction element D03 (through which an electric current can flow to the latter), respectively, as shown. The first switch M01 and the second switch M02 may be MOSFET transistors, for example; as such, the first terminal 215/225 thereof is referred to as a drain thereof and the second terminal 216/226 thereof, as a source, of the MOSFET transistor. The first terminal 225 of the second switch M02 is electrically connected with the control terminal 207 of the power transistor M00 of the switching power supply 200. A second terminal 216 of the first switch M01 receives an input voltage VIN, and a second terminal 226 of the second switch M02 is grounded. Although, as shown, diodes are used as the first unidirectional conduction element D02 and the second unidirectional conducting element D03, MOSFET transistors may be used instead.

The logic circuit, which may take one of a variety of forms, herein includes the two-way NOR gate 232. The NOR gate 232 receives the first control signal Vctrl1 at a first input terminal and a high-frequency pulse signal ch at a second input terminal thereof, respectively, and outputs a voltage regulation signal Vreg. A proximal end p of the power supplying capacitor Cf is to receive the voltage regulation signal Vreg. In order to enhance the capability of the voltage regulation signal Vreg to charge the power supplying capacitor Cf, the buffer 233 is provided, which is electrically connected between the NOR gate 232 output terminal and the proximal end p of the power supplying capacitor Cf, and through the buffer 233 the proximal end p of the power supplying capacitor Cf receives the voltage regulation signal Vreg.

The first control signal Vctrl1 is obtained from an original control signal Vctrl0 through the inverter 231. When the original control signal Vctrl0 is at a high level, the first control signal Vctrl1 reaches a low level, that is, a first state, which causes the first switch M01 to conduct and the second switch M02 to shut off. Shown as an example, the first switch M01 is a P-channel MOSFET and the second switch M02, an N-channel MOSFET. The NOR gate 232 receives the first control signal Vctrl1 and the pulse signal ch at its two input terminals and outputs the voltage regulation signal Vreg, which is characterized as being in a high frequency pulse state. The conduction of the first switch M01 places a high potential at the distal end d of the power supplying capacitor Cf. The voltage regulation signal Vreg being in a high frequency pulse state continuously charges the power supplying capacitor Cf. The potential at the distal end d of the power supplying capacitor Cf is used as a power supplying voltage to drive the power switch M00 of the switching power supply 200 to conduction.

When the original control signal Vctrl0 is at a low level, the first control signal Vctrl1 is at a high level, that is, a second state, which causes the first switch M01 to shut off and the second switch M02 to conduct (with the first switch M01 being a P-channel MOSFET and the second switch M02 being an N-channel MOSFET). At this time, the NOR gate 232 receives the first control signal Vctrl1 at its first input terminal and the pulse signal ch at its second input terminal respectively, and outputs the voltage regulation signal Vreg, which is characterized as being in a low level state. The second switch M02 turning on results in a low potential at the distal end of the power supplying capacitor Cf. The voltage regulation signal Vreg cannot charge the power supplying capacitor Cf at the proximal end p thereof. Thus, the power switch M00 of the switching power supply 200 is turned off at this time.

Figure 3:
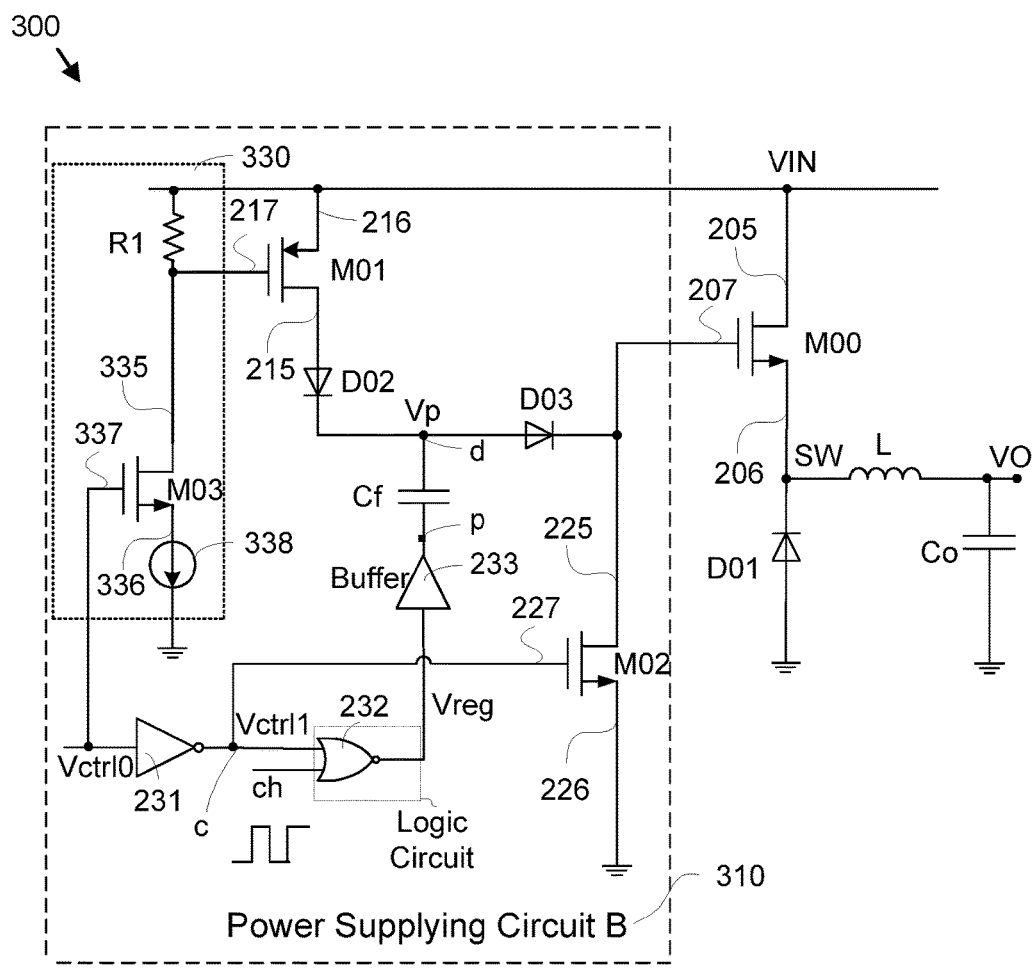
FIG. 3 is a schematic block diagram illustrating an alternate embodiment of a power supplying circuit for drive of a switching power supply of the present invent.

FIG. 3 is a schematic block diagram illustrating an alternate embodiment of a power supplying circuit for drive of a switching power supply 300 of the present invention. The description of the switching power supply 300 refers to elements of FIG. 2, like reference characters referring to like elements. Herein, a situation involving an exceptionally high input voltage is discussed. That is, when the input voltage VIN is greater than a corresponding reference voltage Vref, which, for example, is 5V, the first switch M01 may fail to switch normally. Therefore, a circuit for assisting the first switch M01 in turning on or off, referred to as the auxiliary drive circuit (ADC) 330, is added in the switching power supply 300, resulting in a power supplying circuit B 310. In this embodiment, the control terminal 217 of the first switch M01 does not receive the first control signal Vctrl1 as it does with power supplying circuit A 210 (shown in FIG. 2) because herein an electrical wire connecting the control terminal 217 of the first switch M01 with the node c is removed. This wire is severable by means of a serially connected switch, such as an open-closed switch. (Herein, the switch may be placed in an open position whereas in the power supplying circuit A 210 shown in FIG. 2, the switch may be placed in a closed position.)

As shown, the power supply circuit B 310 includes the auxiliary drive circuit (ADC) 330, which includes a first resistor R1, a third switch M03 and a first current source 338. The first resistor R1 is electrically connected between the control terminal 217 of the first switch M01 and the second terminal 216 of the first switch M01. A first terminal 335 of the third switch M03 is electrically connected with the control terminal 217 of the first switch M01, and a second terminal 336 of the third switch M03 is grounded through the first current source 338 (which is electrically connected with the second terminal 336 of the third switch M03). A control terminal 337 of the third switch M03 receives the original control signal Vctrl0. When the original control signal Vctrl0 is at a high voltage level, the third switch M03 is turned on, and the input voltage VIN produces a voltage drop on the first resistance R1, so that the first switch M01 is turned on smoothly. Herein the third switch M03 uses an N-channel MOSFET.

Additionally, the embodiments are described and illustrated above separately, but to those skilled in the art, techniques in common can be substituted and integrated among the embodiments; in case some aspect of one of the embodiments is not clearly described, another embodiment having the description on the aspect can be referred.

It should be noted that, in this context, relational terms such as first and second are used only to distinguish an entity or operation from another entity or operation, without necessarily requiring or implying any such actual relationship or order between these entities or operations. Moreover, the term 'include,' 'comprise,' or any other variant is intended to encompass a non-exclusive inclusion, so that the process, method, article, or device that includes a series of elements comprises not only those elements themselves, but also those that are not explicitly or other elements that are inherent to such processes, methods, articles or equipment. In the absence of more restrictions, the elements defined by the statement 'including a/an . . . ' do not preclude the presence of the similar additional elements in the process, method, article or equipment.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power supplying circuit, electrically connected with a control terminal of a power switch of a switching power supply, for drive of the switching power supply, comprising:

a power supplying capacitor with a distal end electrically connected with the control terminal of the power switch and a proximal end to receive a voltage regulation signal generated by a first control signal and a pulse signal;

wherein, when the first control signal is in a first state, the voltage regulation signal is characterized as being in a pulse state, and for the duration of the first control signal an electric potential at the distal end of the power supplying capacitor is placed in an effective state and is used as a power supplying voltage to drive the power switch to conduction; and wherein, when the first control signal is in a second state, the voltage regulation signal is characterized as being in a low level state, and for the duration of the first control signal an electric potential at the distal end of the power supplying capacitor is placed in an ineffective state to turn off the power switch.

2. The power supplying circuit for drive of the switching power supply according to claim 1, further comprising:
a first switch, a control terminal of which is to receive the first control signal;
a second switch, a control terminal of which is to receive the first control signal;
a logical circuit to receive the first control signal at a first input terminal;
a first unidirectional conduction element electrically connected between the distal end of the power supplying capacitor and a first terminal of the first switch, such that an electrical current is flowable to the former; and
a second unidirectional conduction element electrically connected between the distal end of the power supplying capacitor and a first terminal of the second switch, such that an electrical current is flowable to the latter;
wherein a first terminal of the second switch is electrically connected with the control terminal of the power switch, and a second terminal of the first switch is to receive an input voltage, and a second terminal of the second switch is electrically connected to ground.

3. The power supplying circuit for drive of the switching power supply according to claim 2, wherein the logic circuit is to receive the pulse signal at a second input terminal and output a voltage regulation signal for receipt by the proximal end of the power supplying capacitor.

4. The power supplying circuit for drive of the switching power supply according to claim 3, further comprising a buffer electrically connected between an output terminal of the logic circuit and the proximal end of the power supplying capacitor, wherein the logic circuit comprises a two-way NOR gate, the NOR gate's first input terminal to receive the first control signal and the second input terminal to receive the pulse signal, and the NOR gate's output terminal to transmit the voltage regulation signal to the buffer, which is to pass the voltage regulation signal to the proximal end of the power supplying capacitor.

5. The power supplying circuit for drive of the switching power supply according to claim 2, wherein, when the first control signal is in the first state, the first switch is turned on and the second switch is turned off, and when the first control signal is in the second state, the first switch is turned off and the second switch is turned on.

6. The power supplying circuit for drive of the switching power supply according to claim 2, wherein the first switch is a P-channel MOSFET, and the second switch is an N-channel MOSFET.

7. The power supplying circuit for drive of the switching power supply according to claim 2, wherein the first unidirectional conduction element and the second unidirectional element are selected from a group consisting of diode and MOSFET.

8. The power supplying circuit for drive of the switching power supply according to claim 1, further comprising an inverter through which the first control signal is obtained from an original control signal, which occurs at an input terminal of the inverter.

9. The power supplying circuit for drive of the switching power supply according to claim 1, further comprising:
a first switch;
a second switch, a control terminal of which is to receive the first control signal;
a logical circuit to receive the first control signal at a first input terminal;
a first unidirectional conduction element electrically connected between the distal end of the power supplying capacitor and a first terminal of the first switch, such that an electrical current is flowable to the former;
a second unidirectional conduction element electrically connected between the distal end of the power supplying capacitor and a first terminal of the second switch, such that an electrical current is flowable to the latter;
a first resistor;
a third switch; and
an inverter through which the first control signal is obtained from an original control signal, which occurs at an input terminal of the inverter;
wherein a first terminal of the second switch is electrically connected with the control terminal of the power switch, and a second terminal of the first switch is to receive an input voltage, and a second terminal of the second switch is electrically connected to ground; and
wherein the first resistor is electrically connected between a control terminal of the first switch and the second terminal of the first switch, a first terminal of the third switch is electrically connected with the control terminal of the first switch, a second terminal of the third switch is electrically connectable to ground, and a control terminal of the third switch is to receive the original control signal.

10. The power supplying circuit for drive of the switching power supply according to claim 9, further comprising a first current source electrically connected between the second terminal of the third switch and ground, with an electric current flowing from the former.

11. A switching power supply comprising:
a power switch, a power supplying circuit for drive of the switching power supply and an output module;
a first terminal of the power switch to receive an input voltage;
a second terminal of the power switch electrically connected with the output module, which comprises an inductor, a diode and a capacitor, wherein the diode is replaceable by a MOSFET;
a control terminal of the power switch electrically connected with the power supplying circuit for drive of the switching power supply;
the power supplying circuit for drive of the switching power supply comprising:
a power supplying capacitor, a distal end of which is electrically connected with the control terminal of the power switch, and a proximal end of which is to receive a voltage regulation signal generated by a first control signal and a pulse signal;
wherein, when the first control signal is in a first state, the voltage regulation signal is characterized as being in a pulse state, and for the duration of the first control signal an electric potential at the distal end of the power supplying capacitor is placed in an effective state and is used as a power supplying voltage to drive the power switch to conduction; and wherein, when the first control signal is in a second state, the voltage regulation signal is characterized as being in a low level state, and for the duration of the first control signal the electric potential at the distal end of the power supplying capacitor is placed in an ineffective state to turn off the power switch.

12. The switching power supply according to claim 11, wherein the power supplying circuit for drive of the switching power supply further comprises:
a first switch, a control terminal of which is to receive the first control signal;
a second switch, a control terminal of which is to receive the first control signal;
a logical circuit to receive the first control signal at a first input terminal;
a first unidirectional conduction element electrically connected between the distal end of the power supplying capacitor and a first terminal of the first switch, such that an electric current is flowable to the former; and
a second unidirectional conduction element electrically connected between the distal end of the power supplying capacitor and a first terminal of the second switch, such that an electric current is flowable to the latter;
wherein a first terminal of the second switch is electrically connected with the control terminal of the power switch, and a second terminal of the first switch is to receive an input voltage, and a second terminal of the second switch is electrically connected to ground.

13. The switching power supply according to claim 12, wherein the logic circuit is to receive the pulse signal at a second input terminal and output a voltage regulation signal for receipt by the proximal end of the power supplying capacitor.

14. The switching power supply according to claim 12, wherein, in the power supplying circuit for drive of the switching power supply, when the first control signal is in the first state, the first switch is turned on and the second switch is turned off, and when the first control signal is in the second state, the first switch is turned off and the second switch is turned on.

15. The switching power supply according to claim 13, wherein the power supplying circuit for drive of the switching power supply further comprises a buffer electrically connected between an output terminal of the logic circuit and the proximal end of the power supplying capacitor, wherein the logic circuit comprises a two-way NOR gate, the NOR gate's first input terminal to receive the first control signal and the second input terminal to receive the pulse signal, and the NOR gate's output terminal to transmit the voltage regulation signal to the buffer, which is to pass the voltage regulation signal to the proximal end of the power supplying capacitor.

16. The switching power supply according to claim 11, wherein the power supplying circuit for drive of the switching power supply further comprises an inverter through which the first control signal is obtained from an original control signal, which occurs at an input terminal of the inverter.

17. The switching power supply according to claim 12, wherein the first switch is a P-channel MOSFET, and the second switch is an N-channel MOSFET in the power supplying circuit for drive of the switching power supply.

18. The switching power supply according to claim 11, wherein the power supplying circuit for drive of the switching power supply further comprises:
a first switch;
a second switch, a control terminal of which is to receive the first control signal;
a logical circuit to receive the first control signal at a first input terminal;
a first unidirectional conduction element electrically connected between the distal end of the power supplying capacitor and a first terminal of the first switch, such that an electrical current is flowable to the former;
a second unidirectional conduction element electrically connected between the distal end of the power supplying capacitor and a first terminal of the second switch, such that an electrical current is flowable to the latter;
a first resistor;
a third switch; and
an inverter through which the first control signal is obtained from an original control signal, which occurs at an input terminal of the inverter;
wherein a first terminal of the second switch is electrically connected with the control terminal of the power switch, and a second terminal of the first switch is to receive an input voltage, and a second terminal of the second switch is electrically connected to ground; and
wherein the first resistor is electrically connected between a control terminal of the first switch and the second terminal of the first switch, a first terminal of the third switch is electrically connected with the control terminal of the first switch, a second terminal of the third switch is electrically connectable to ground, and a control terminal of the third switch is to receive the original control signal.

19. The switching power supply according to claim 18, wherein the power supplying circuit for drive of the switching power supply further comprises a first current source electrically connected between the second terminal of the third switch and ground, with an electric current flowing from the former.

20. The switching power supply according to claim 12, wherein the first unidirectional conduction element and the second unidirectional conduction element are selected from the group consisting of diode and MOSFET.

* * * * *